Aug. 4, 1964 D. J. HOWE 3,143,420
PRESCREENING FILM BY CLAYDEN AND HERSCHEL EXPOSURE
Filed Nov. 14, 1960
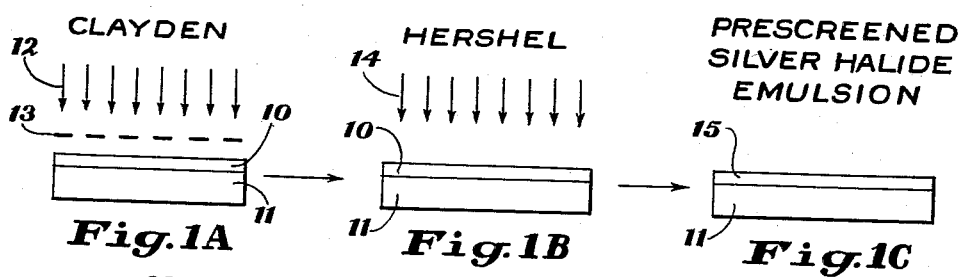
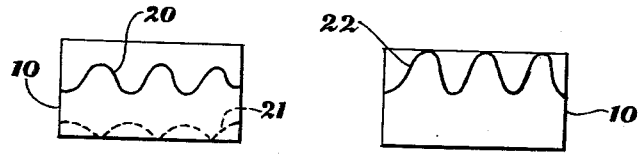
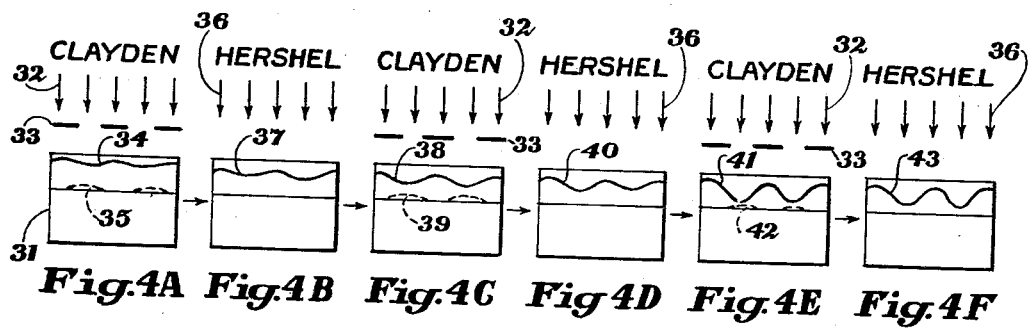
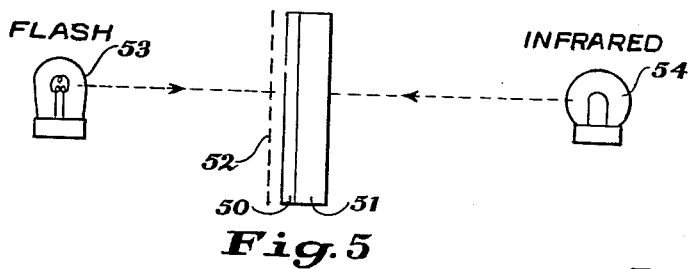
Donald J. Howe
INVENTOR.
BY
ATTORNEYS

United States Patent Office 3,143,420
Patented Aug. 4, 1964

3,143,420
PRESCREENING FILM BY CLAYDEN AND
HERSCHEL EXPOSURE
Donald J. Howe, Rochester, N.Y., assignor to Eastman
Kodak Company, Rochester, N.Y., a corporation of
New Jersey
Filed Nov. 14, 1960, Ser. No. 69,153
4 Claims. (Cl. 96—79)

This invention relates to prescreened film, i.e. to film which has variations in sensitivity distributed in a halftone pattern.

The invention is specifically an improved film of the type described in U.S. Patent 2,691,586 to John A. C. Yule and Richard E. Maurer. Cross reference is also made to the cofiled application Serial No. 69,154 by Donald J. Howe and Richard E. Maurer having to do with continuous prescreening of film.

The present invention relies on the discovery that Clayden desensitization is not removed, at least to any appreciable extent, by subsequent exposure to infrared light sufficient to produce the Herschel effect with respect to any surface latent image in the emulsion. The Clayden exposure which is a very brief, relatively high intensity exposure does produce a very slight but nevertheless objectionable effect similar to a latent image. Apparently a latent image when below threshold (i.e. less than that which appears as fog during normal development) shows up as a sensitization which in the case of a Clayden exposure is a decrease in the Clayden effect. In any case, this "latent image" constitutes a limitation on the amount of Clayden desensitization which may be obtained. There is little point in Clayden desensitizing an area of a film to reduce the production of latent image during subsequent exposures, if, at the same time, one produces a latent image by the Clayden exposure itself. Even below threshold the tendency toward a latent image has the effect of sensitization (i.e. pre-exposing up to threshold) which counteracts some of the desired desensitization. The Herschel effect wipes out the latent image effect and leaves the Clayden effect unencumbered but fully effective. The invention is applicable to low temperature Clayden prescreening; see cofiled application Serial No. 69,152 by J. A. C. Yule.

Thus the invention consists of infrared exposure following a Clayden prescreening exposure. The resulting prescreened material has a greatly extended scale between the centers and corners of the halftone dots, i.e. between the points of maximum and minimum sensitivity.

Another characteristic of the Clayden effect is that it is not strictly cumulative. One gets much greater Clayden effect by a single exposure of a given intensity than one normally obtains by two exposures each of the same duration but of only half the intensity. This may be due to the fact that the total exposure time is twice as long. However, even if the exposure time is cut in half and the intensity remains constant, the two exposures do not add to give as much effect as the single exposure of the optimum duration. This is another aspect of the Clayden effect wherein the present invention produces an unexpected advantage. For example if one breaks up the Clayden exposure into a series of Clayden exposures each followed by a Herschel clean up of latent image, the film is apparently restored each time to a higher sensitivity to further Clayden desensitization and thus the Clayden effects do add up to give greater and greater desensitization. Thus one preferred form of prescreened material according to the present invention is one which is desensitized by successive Clayden exposures each followed by an infrared flash sufficient to remove the surface latent image caused by the Clayden exposure. The term "surface latent image" refers to the accepted photographic theory which distinguishes between internal latent images and surface latent images on each silver halide grain in an emulsion. The Clayden effect is a desensitizing of the surface of the grain. The Herschel effect removes surface latent images and, as mentioned above, restores Clayden sensitivity. It is not known whether these two effects of the Herschel exposure are independent, but presumably they are simply manifestations of the same phenomenon. For one thing, I have further discovered that the Clayden exposures may be given successively and the Herschel clean up for all of them can be given after the last Clayden exposure, with approximately all of the advantages of the alternating Clayden-Herschel process. This has significance both in the theory and in practice. In theory it indicates that the full Clayden effect of successive exposures is probably always present but is masked by the surface latent image (until the latter is removed). In practice it means that all of the Clayden exposures can be given in succession and the Herschel exposure need be given only once. Thus the preferred form of the invention is a film prescreened by a succession of Clayden exposures followed (individually or after the final one) by a Herschel "clean-up."

The advantages and details of the present invention will be more fully understood from the following description when read in connection with the following drawing in which:

FIGS. 1A, 1B and 1C are a schematic flow chart of the preparation of a prescreened film according to the present invention.

FIGS. 2 and 3 are schematic representations of the amounts of the effects at the two stages of the process illustrated in FIGS. 1A to 1C.

FIGS. 4A to 4F similarly illustrate a different embodiment of the invention.

FIG. 5 illustrates one method of providing alternative Clayden and Herschel exposures.

In FIGS. 1A to 1C, a Clayden sensitive silver halide emulsion 10 on a film support 11 is given a Clayden exposure represented by arrows 12 through a ruled halftone screen represented at 13. Clayden sensitive films are well known and any of the desired contrast may be used. However, the present invention adds even greater latitude since some films are normally not considered Clayden sensitive since the desensitizing effect is masked by the accompanying sensitizing effect but the present invention can utilize them since the sensitizing effect is eliminated. In general the preferred embodiments use standard Clayden sensitive high contrast films. Of course, if the film does not show an appreciable Clayden sensitivity (under the sensitizing) the Herschel removal of the sensitizing does not have the useful effect it has in the present invention; there is no appreciable Clayden effect to uncover.

The Clayden exposure is normally provided by a high intensity flash lamp held sufficiently close to the film to give a high degree of Clayden desensitization but without fogging the film. Electronic flash lamps giving about $\frac{1}{1000}$ second exposure held at 60 inches from a lith type film, are excellent for this purpose. The Clayden effect requires high intensity exposures, but these are still below or just at the normal threshold exposure for the emulsion. Nevertheless these Clayden exposures do produce a faint latent image or sensitization which causes a reduction in the Clayden desensitization. That is, the Clayden exposures themselves counteract slightly the Clayden desensitization and particularly they tend to reduce the ability of the emulsion to be further Clayden desensitized. This is represented schematically in FIG. 2. The curve 20 is intended to represent the sensitivity of the emulsion which is relatively high where it has not received any Clayden exposure and is relatively low where it has received the maximum Clayden exposure. However, the maximum Clayden exposure has been accompanied by some latent image as indicated by the dotted line 21. These curves represent sensitivity and latent image density distribution values rather than any spacially distributed differences in the emulsion as one goes from top to bottom of the emulsion layer. Perhaps more important than the latent image 21 aligned with the areas of maximum desensitization is the fact that the emulsion in these areas has been sensitized so that the Clayden effect is reduced and also cannot be further desensitized by Clayden exposure without becoming highly fogged. Additional Clayden exposure will appear to cause more latent image rather than further desensitization.

In FIG. 1B the screen 13 has been removed and the emulsion 10 is flooded with infrared exposure sufficient to produce the Herschel effect which fades or removes any latent image. So-called "heat lamps" with infrared filters or semi-reflectors to remove the visible part of the light, are adequate as sources of infrared. The effect in the finished product is a slight but very useful increase in the Clayden effect. The curve 22 is drawn slightly higher than the curve 20 to illustrate this apparent increase in the Clayden effect. Since the Herschel effect is needed most in the areas where the Clayden exposure has ben greatest, the infrared exposure may be made through the screen 13, but since it works whether the screen is present or not, FIG. 1B omits the screen.

Curve 22 represents a greater difference between the maximum and the minimum sensitivity in the emulsion layer 10. Thus the prescreened silver halide emulsion layer 15 shown in FIG. 1C has a halftone pattern of undulating sensitivity uniformly distributed through the layer with the areas of lower sensitivity Clayden desensitized and with the same (or all) areas flashed with infrared so as to remove by the Herschel effect any surface latent image in the emulsion. The Herschel effect does not depend on the duration of the infrared exposure whereas, of course, Clayden effect is obtained primarily with brief exposures.

In FIGS. 4A to 4F the emulsion layer 30 on a support 31 receives a flash exposure 32 through a halftone screen 33 to produce a variation in sensitivity represented by the curve 34 and to produce a latent image (or slight sensitization) represented by the broken curve 35. A Herschel infrared exposure represented by arrows 36 is then given which reduces the latent image and all adverse effects represented by the broken line 35 but leaves or even improves the Clayden effect on sensitivity as represented by the curve 37. A second Clayden exposure is then given which improves the Clayden desensitization as shown by the curve 38 but produces a latent image or slight sensitization represented by the broken lines 39. A second Herschel effect then removes the latent image 39 and enhances the Clayden effect as shown by curve 40. A third Clayden exposure produces additional Clayden effect so that the total as represented by the curve 41 is enhanced, but again produces a latent image 42. A third Herschel infrared exposure removes the latent image and gives a Clayden prescreening represented by the curve 43 which has a greater scale and a substantially complete absence of any latent image as compared to simple Clayden prescreening. In this multiple Clayden prescreening system, made possible by the Herschel cleanup provided by the present invention, the Clayden exposure must be carefully registered of course and the Herschel exposure is normally an overall flash, although in fact, Herschel exposure through the screen itself is quite useful since it reaches the areas which need the Herschel exposure most. Thus one form of the invention gives both the Clayden exposure and the Herschel exposure through halftone screens. The preferred embodiment is illustrated with the Herschel exposure a uniform one rather than a screened one.

The steps shown in FIGS. 4B and 4D may be omitted and all of the clean-up may be provided by the final step (FIG. 4F).

FIG. 5 illustrates one system of giving a uniform Herschel exposure between the successive Clayden flash exposures. In this case the image 50 is coated on a transparent base 51; at least the base must be transparent to infrared. A Clayden flash exposure is given through a ruled screen 52 by means of an electronic flash lamp 53 whose duration is about 1 millisecond and whose intensity, determined by the distance of the flash lamp from the emulsion surface 50 is sufficient to give a high order of Clayden desensitization behind each aperture of the screen 52. Following each flash exposure, the infrared lamp 54 is turned on to expose the emulsion 50 through base 51 and, since the film is not sensitive to infrared as far as the creation of a latent image is concerned, the only effect is to reduce any latent image caused by Clayden exposure. The infrared lamp 54 may be on during the flash exposure 53. In fact it may remain on continuously during a series of flash exposures. However, there must be some infrared after the final flash exposure and since the infrared exposure is a relatively slow operation as compared to the millisecond flash exposure, it is customary to allow the infrared to stay on a second or more to insure maximum Herschel effect.

Clayden sensitive emulsions are well known and, of course, the present invention is primarily useful only with emulsions which show fairly high Clayden effect. All such Clayden sensitive emulsions, sensitive to visible light, apparently can be Herschel treated by infrared exposure. The invention does not apply to infrared sensitive emulsions unless far-infrared (beyond the actinic zone) is used for the Herschel clean-up.

Emulsions whose Clayden sensitivity is normally masked by the accompanying latent image or sensitization can also be used with the present invention although they are not normally considered Clayden sensitive and are less preferred than the normal Clayden sensitive emulsions.

Having thus described preferred embodiments of my invention I wish to point out that it is not limited to the processes herein described but is of the scope of the appended claims.

I claim:
1. The method of making a halftone sensitive material comprising the steps of exposing at least once a uniformly thick Clayden-sensitive and Herschel-sensitive layer of photosensitive silver halide emulsion through a uniform halftone screen to a high-intensity short-duration uniform flash having sufficient intensity and sufficiently short duration to produce a Clayden desensitization of the emulsion layer, said emulsion layer after said flash exposure having a sensitivity distributed over the layer in an undulating halftone pattern with a corresponding distribution of a faint surface latent image at the Clayden desensitized areas reducing the effect of the undulating pattern of sensitivity; and then exposing the Clayden desensitized emulsion layer at least at the Clayden desensitized areas to a non-surface latent image forming infrared exposure sufficiently to substantially remove by Herschel effect the faint surface latent image created by the Clayden desensitizing flash exposure, thereby increasing the effect of the undulating halftone pattern of sensitivity.

2. A halftone sensitive material produced by the method of claim 1.

3. The method of making a halftone sensitive material comprising the steps of first exposing a uniformly thick Clayden-sensitive and Herschel-sensitive layer of photosensitive silver halide emulsion through a uniform halftone screen to a high-intensity and sufficiently short duration flash to produce a Clayden desensitization of the emulsion layer, said emulsion layer after said flash exposure having a sensitivity distributed over the layer in an undulating halftone pattern with a corresponding distribution of a faint surface latent image at the Clayden desensitized areas reducing the effect of the undulating sensitivity; secondly exposing the Clayden desensitized emulsion layer at least at the Clayden desensitized areas to a non-surface latent image forming infrared exposure sufficiently to substantially remove by Herschel effect the faint surface latent image created by the Clayden desensitizing flash exposure, thereby increasing the effect of the undulating pattern of sensitivity; and then sequentially repeating the first and second exposure steps at least once to increase the undulation of the halftone pattern of sensitivity while correspondingly removing by Herschel effect the faint surface latent image created by each successive Clayden desensitizing flash.

4. A halftone sensitive material made according to the method of claim 3.

References Cited in the file of this patent
UNITED STATES PATENTS

| | | |
|---|---|---|
| 2,691,580 | Howe | Oct. 12, 1954 |
| 2,691,586 | Yule et al. | Oct. 12, 1954 |
| 2,912,325 | Maurer | Nov. 10, 1959 |
| 2,987,397 | Maurer | June 6, 1961 |

OTHER REFERENCES

Sassai: Science and Applications of Photography (proceedings of the R.S.P. Centenauj Conference, London, 1953), The Royal Photographic Society of Great Britain, London S.W. 7, pages 83–85.

Baines: "The Science of Photography," 1958, John Wiley and Sons, N.Y., pages 174–175. (Copy in Sci. Library: T.R. 200 B 3.)